United States Patent [19]

Brabston et al.

[11] Patent Number: 5,366,547

[45] Date of Patent: Nov. 22, 1994

[54] SETTING CONTROL FOR ALKALI-ACTIVATED SILICATE BINDERS

[75] Inventors: William N. Brabston; Philip G. Malone; Toy S. Poole; Joe G. Tom, all of Vicksburg, Miss.

[73] Assignee: U.S. Army Corps of Engineers as represented by the Secretary of the Army, Washington, D.C.

[21] Appl. No.: 64,998

[22] Filed: May 24, 1993

[51] Int. Cl.$^5$ .................... C04B 12/02; C04B 12/04
[52] U.S. Cl. .................. 106/690; 106/629; 106/691; 106/705; 106/707; 106/789
[58] Field of Search ............. 106/629, 789, 690, 691, 106/705, 707

[56] References Cited

U.S. PATENT DOCUMENTS

| 4,288,252 | 9/1981 | Neely | 106/629 |
| 4,306,912 | 12/1981 | Forss | 106/789 |
| 4,312,673 | 1/1982 | Neely, Jr. | 106/629 |
| 4,319,926 | 3/1982 | Nowakowski et al. | 106/629 |
| 4,328,033 | 5/1982 | Boberski et al. | 106/629 |
| 4,412,863 | 11/1983 | Neely, Jr. | 106/629 |

FOREIGN PATENT DOCUMENTS

| 664265 | 6/1963 | Canada | 106/629 |
| 53-149225 | 12/1978 | Japan | 106/629 |
| 58-204857 | 11/1983 | Japan | 106/629 |
| 590290 | 1/1978 | U.S.S.R. | 106/629 |

Primary Examiner—Anthony Green
Attorney, Agent, or Firm—Luther A. Marsh

[57] ABSTRACT

An alkali-activated silicate based cement or binder has a cure characteristic which is modified by a phosphate additive which retards the set time of the cement or binder. The phosphate allows a longer set time than conventional alkali-activated silicate glass cements.

17 Claims, No Drawings

SETTING CONTROL FOR ALKALI-ACTIVATED SILICATE BINDERS

BACKGROUND OF THE INVENTION

The invention relates to additives for inorganic cements. In particular, the invention relates to a retarder or setting control for alkali-activated silicate cements or binders.

Alkali-activated glass-based binders have very rapid set times. In some circumstances, the set time is so short that the materials cannot be used for some applications in general construction. For some compositions, the time to initial set is often less than 60 minutes making it difficult to mix, place and finish.

The alkali-activated cements have been extensively studied and are well known in the art. Indeed, one of the important features of alkali-activated materials is that they tend to set up and cure to relatively high strengths in a matter of hours. This is useful in military applications, for example, runway repair. However, as noted above, the initial set of these materials is sometimes so rapid that the material can cure in the mixing apparatus creating serious and costly maintenance problems.

SUMMARY OF THE INVENTION

The present invention eliminates and obviates the difficulties associated with prior art alkali-activated silicate binder systems by providing a retarder or setting control condensed phosphate additive. In one embodiment, the additive comprises an efficacious amount of metaphosphate which is preferably added to the alkali activating solution. The metaphosphate additive may be varied to produce a specific set time for a given mixture at a specified temperature.

A particular embodiment of the invention comprises (A) 100 parts by weight of silicate glass, amorphous silicate or alumino-silicate; (B) up to 10 parts by weight based upon (A) of an alkali; (C) up to 10 parts by weight based upon (A) of a metaphosphate or polyphosphate; and up to 400 parts by weight based upon (A) of an aggregate filler.

DESCRIPTION OF THE PREFERRED EMBODIMENTS

The invention, in general, is a retarder or setting control agent for use with those inorganic cements or binders that are based on the reaction of a silicate-glass, other amorphous silicate, or alumino-silicate, with an alkaline solution. The set control cement or binder of the present invention contains a phosphate retarder which allows the binder to be used for paving or general construction and fabrication of precast items when mixed with a suitable aggregate or filler, with far less stringent time requirements between mixing and placement than prior art systems. In accordance with the invention, a suitable retarder is a methaphosphate which results in a binder having many of the characteristics of conventional alkali-activated silicate-glass cements with longer initial set times.

In a particular embodiment, the invention is a binder comprising an (A) alkali-activated silicate; (B) an alkali-activator; and (C) an efficacious amount of metaphosphate or polyphosphate retarder in solution with the alkali-activator. The preferred metaphosphates are sodium metaphosphate purified, for example, a material designated as (CAS NO. 68915-31-1) or sodium hexametaphosphate, for example, a material designated as (CAS NO. 10125-56-8).

(A) the alkali activated silicate is a silicate based raw material such as silicate glass, amorphous silicate or aluminosilicate or slag or mixtures thereof. (A) (sometimes referred to as the base material) preferably is granular in form and may be any of the materials described in Forss. U.S. Pat. No. 4,306,912 which is incorporated herein by reference.

(B) the alkali-activator is preferably an alkali solution that contains a sufficient amount alkali necessary to activate the base material. In an exemplary embodiment, the alkali is present in an amount approximately 6 parts by weight based upon 100 parts of dry reactive base material.

(C) is a methaphosphate or condensed polyphosphate added to the alkali solution (B) in amounts that can vary from less than 1 part by weight to greater than 10 parts by weight based upon the base material (A).

The alkali/phosphate solution is then mixed with the ground reactive base material plus (D) an aggregate or filler material. The mixture can be placed, vibrated or screened to form the item being fabricated.

The metaphosphate additive can be varied to produce a specific setting time for a given mixture at a given temperature. For example, in one embodiment of the invention, a delay of approximately 7 hours in the initial setting time was achieved by the addition of 5 parts by weight based upon 100 parts (A) of sodium metaphosphate and mixed with a solution also containing 6 parts by weight sodium hydroxide.

Component (A) is the base material for various forms of silicate based binders or cements. Generally, Component (A) comprises silicate glass, or other amorphous silicates such as slag or an amorphous alumino silicate such as fired clay. In general, the materials comprise fine grained silica and alumina rich solids. A wide variety of materials can be used as the source of the silica and alumina such as slag, fly ash and ground rock. The purity of the base material is often times difficult to ascertain. Generally, however, the base material is inorganic.

The material is generally formed or granulated to a median particle size about 0.01 mm and a surface area about 500 $m^2$/kg, as determined in accordance with ASTM method C 204 otherwise known to those skilled in the art as Blaine or air permeability. The particle size may vary in range from less than 0.0001 mm to about 0.1 mm and preferably from about 0.001 mm to about 0.030 mm. Similarly, the resulting surface area may vary in range from abour 300 to about 1000 $m^2$/kg (Blaine) and preferable from about 350 to about 650 $m^2$/kg (Blaine).

Suitable sources of the silica or alumina include volcanic pumice; volcanic trass; fine-grained effusive rock, for example, perlite, liparite, andesite and basalt; fly ash; cement kiln dust; lime kiln dust; silica fume; metallurgical slags such as titaniferrous, ferromanganese, nickel-iron, cupola, open hearth, electrothermophosphoric, clay including fired clay such as kaolinite, illite and montmorillonite; and mineral-rich ash. See U.S. Pat. No. 4,306,912 referred to above.

Component (B) is the alkali-activator. In accordance with the invention, it is preferred to employ sodium hydroxide (NaOH) in a solution to activate the base material. Although the alkali-activator may be added as a solid ground material to the glassy base material (A), it is preferred to add the activator as a liquid solution.

Addition of the activator as a dry material to the base presents some difficulties in storage.

Some sources of the alkali include alkali metal hydroxides such as sodium hydroxide. Other material include halide, carbonate, sulfate, silicate and aluminate salts. The preferred activator is sodium hydroxide.

Component (B) is present in amounts ranging from about 1 to about 10 parts by weight based upon (A). Component (B) is preferably present in amounts ranging from about 3 to about 7 and more preferable 4 to 6 parts by weight based upon (A). In one embodiment, (B) is preferably present in an amount of about 6 parts by weight based upon (A).

Component (C), the retarder is, a metaphosphate or other condensed polyphosphate. Preferably, the retarder is sodium metaphosphate which is added to the alkali solution in an amount sufficient to cause the desired cure rate for the binder. Component (C) may be varied from about less than 1 part by weight to greater than 10 parts by weight based upon Component (A). Preferably, Component (B) varies from about 3 to about 7 parts by weight based upon (A). More preferably, Component (C) varies from about 4 to about 6 parts by weight.

Component (D), the filler, may comprise any filler materials compatible with silicate-based binders. Such materials include materials well known in the art. Filler may be present in varying amounts generally up to about 400 parts by weight based upon 100 parts of Component (A).

The amount of liquid added to the material to form a cured binder varies from about 35 to about 65 and more preferably from about 40 to about 60.

EXAMPLE 1

A mixture consisting of 100 parts of ground granulated blast furnace slag, six parts by weight of sodium hydroxide, and 40 parts by weight of water, and 1 part by weight of sodium metaphosphate is prepared and cured at 23° C. The time of setting is 3 hours.

EXAMPLE 2

A mixture consisting of 100 parts of ground granulated blast furnace slag, six parts by weight of sodium hydroxide and 40 parts by weight of water, and 2.5 parts by weight of sodium metaphosphate is prepared and cured at 23° C. The time of setting is 5 hours and 35 minutes.

EXAMPLE 3

A mixture consisting of 100 parts of ground granulated blast furnace slag, six parts by weight of sodium hydroxide, and 40 parts by weight of water, and 5 parts by weight of sodium metaphosphate is prepared and cured at 23° C. The time of setting is 6 hours and 50 minutes.

It is apparent from the foregoing that Component (C), the phosphate retarder, can delay the set time for alkali-activated glass binders so that a practical mix and placement time is achieved. At the same time, the advantages of a relatively quick cure and high-strength materials are retained. The resulting binder appears to retain its strength and to form reaction products that are typical of alkali-glass reactions where the phosphate retarder is not present. The retarder does not appear to change the fundamental chemistry of the cement setting. The invention allows for the use of alkali-activated glass cements in circumstances where rapid placement has heretofore not been practical. The invention therefore greatly increases the usefulness of alkali-activated glass cements allowing them to be used in work schedules similar to those of conventional cements in construction and paving.

Alternatives to the metaphosphate retarder used in the examples above include sodium metaphosphate, potassium metaphosphate. It is believed that the nature of the retarding effect observed relates to the ability of the metaphosphate to bind calcium and other reactive ions produced during the alkali attack on the silicate or glass material. The retarder will have a similar effect if it is formulated from other metaphosphate salts such as potassium metaphosphate. The metaphosphate is a material having the formula $(NaPO_3)_n$ where n produces a chain length sufficient to bind calcium, e.g., about 2–13 preferably 3–7. According to the Merck Index, sodium metaphosphate generally comprises 22.54 percent Na, 78.45% $HPO_3$ and 69.62 percent $P_2O_5$. The formula for sodium metaphosphate is $(NaPO_3)_n$ where n may be 2 or more, generally 2–13 and preferably 3–7. The best known metaphosphate is hexametaphosphate $(H_6O_{18}P_6.6Na)$. The material is colorless, glassy, transparent, hygroscopic sticks, or white flakes or powder. The material has a density of about 2.5 gm/cc and is soluble in water with alkaline reaction. Other materials, e.g., potassium, may be substituted for the sodium.

Additionally, other condensed polyphosphates with the same activity as sodium metaphosphate but with slight structural differences should show a similar retarding effect on alkali-activated glass cements. A suitable polyphosphate has the formula $Na_{n+2}P_nO_{3n+1}$ where n produces a chain length sufficient to bind calcium, e.g., about 2–10. In either case, suitable polyphosphates and metaphosphates may be generalized as phosphate salts.

While there has been described what at present are considered to be the preferred embodiments of the present invention, it will be readily apparent to those skilled in the art that various changes and modifications may be made therein without departing from the invention and it is intended in the appended claims to cover such changes and modifications as fall within the true spirit and scope of the invention.

What is claimed is:

1. An alkali-activated silicate composition comprising:
   (A) 100 parts by weight of a silicate based, largely amorphous, calcium-rich material;
   (B) from about 0.5 to about 10 weight percent based upon (A) of an alkali; and
   (C) an efficacious amount of a phosphate retarder selected from the group consisting of sodium metaphosphate, sodium polyphosphate, potassium metaphosphate and potassium polyphosphate for retarding cure of the composition.

2. The composition of claim 1, wherein Component (B) is present in an amount of from about 0.5 to about 10 parts by weight based upon (A).

3. The composition of claim 1, wherein Component (B) is present in an amount ranging from about 3 to about 7 parts by weight based upon (A).

4. The composition of claim 1, wherein Component (B) is present in an amount from about 4 to about 6 parts by weight based upon (A).

5. The composition of claim 1, wherein Component (C) is present in an amount from about 1 to about 10 parts by weight, based upon (A).

6. The composition of claim 1, wherein Component (C) is present in an amount from about 3 to about 7 parts by weight based upon (A).

7. The composition of claim 1, wherein Component (C) is present in an amount from about 4 to about 6 parts by weight based upon (A).

8. The composition of claim 1, wherein Component (C) comprises metaphosphates selected from the group consisting of sodium metaphosphate and potassium metaphosphate.

9. The composition of claim 1, wherein (C) is a polyphosphate comprises a material having the general formula:

$$Na_{n+2}P_nO_{3n+1}$$

and n produces a chain length sufficient to bind calcium.

10. The composition of claim 9, wherein n ranges from about 2 to about 13.

11. The composition of claim 9, wherein n ranges from about 3 about 7.

12. The composition of claim 1, wherein (C) is a metaphosphate having the formula $(NaPO_3)_n$ where n produces a chain length sufficient to bind calcium.

13. The composition of claim 12, wherein n ranges from about 2 to about 13.

14. The composition of claim 12, wherein n ranges from about 3 to about 7.

15. The composition of claim 1, wherein (B) comprises mixtures of metal compounds that form alkali hydroxides that attack silicates.

16. The composition of claim 1 wherein said calcium-rich material comprises slag.

17. The composition of claim 1 wherein said calcium-rich material comprises fly ash.

* * * * *